March 18, 1969     T. A. BRIERLEY     3,432,888
TIRE MOLD
Filed Nov. 1, 1966
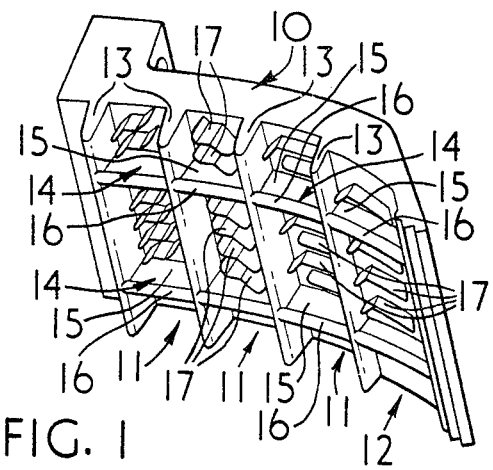
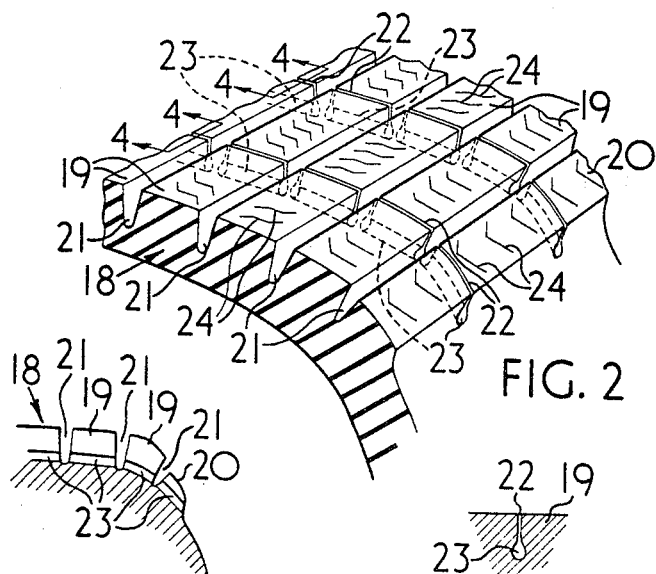
Thomas Albert Brierley
INVENTOR
By Rauber & Lazar
HIS ATTORNEYS

United States Patent Office 3,432,888
Patented Mar. 18, 1969

3,432,888
TIRE MOLD
Thomas Albert Brierley, Birmingham, England, assignor, by mesne assignments, to Dunlop Tire and Rubber Corporation, Buffalo, N.Y., a corporation of New York
Filed Nov. 1, 1966, Ser. No. 591,322
U.S. Cl. 18—44
Int. Cl. B29c 1/00
12 Claims This invention relates to pneumatic tires and more particularly to apparatus for producing the tires.

Great difficulty has been experienced in the removal by pneumatic tires of water lying upon a road surface. Pneumatic tire braking and driving forces are transmitted through a flattened area of the tire in contact with the ground and while under normal low speed, dry road conditions, the whole of the contact area is effective for the transmission of these forces, a proportion of the contact area becomes ineffective under wet road conditions at speed since it is isolated from the road surface by a film of water. The difficulty is greatly accentuated when the vehicle travels through the water at high speed, for example at 60 m.p.h. or more, and the greater the speed of the vehicle, the smaller the effective contact area of each tire with the ground since the vehicle tends to ride over the water. At a certain minimum speed depending upon the weight of the vehicle, the tires with which it is fitted, the tire inflation pressure, and the amount of water lying upon the road surface, the tires will ride completely over the water and be isolated from the road surface by a water film. This has become known as "vehicle aquaplaning."

It will be appreciated, therefore, that the length of the effective contact area of tire tread with the ground for each tire becomes shorter with increasing speed and that, at the same time, there is a reduced duration during which water can be removed prior to the establishment of effective road contact, e.g. at 60 m.p.h. the duration of time of any part of the tread in the whole of the contact area, part of which, as will be appreciated is ineffective, is approximately 0.007 second.

It is therefore imperative to remove water from the road surface, prior to and in the contact area, with the greatest possible speed and this has been achieved, in the past, by physical displacement of water by the tire, after the manner of a bow wave created by a boat, and by provision of circumferential drainage grooves, but these are not sufficiently effective at high speed to avoid serious loss of grip or aquaplaning.

It is an object of the present invention to provide an apparatus for moulding at least the tread portion of a pneumatic tire to provide a tire which will give an increased resistance to the aquaplaning effect described above.

According to the invention there is provided apparatus for moulding at least the tread portion of a pneumatic tire comprising a generally annular tread moulding matrix having, on its radially inner surface, at least one generally circumferential groove formed therein for moulding a rib in the tread portion and a plurality of circumferentially spaced-apart moulding projections extending radially inwardly from the base of the groove, each projection comprising a radially outer stem portion for moulding an opening in the rib and a radially inner head portion for moulding a channel, the head portion extending transversely across the groove.

Generally circumferential moulding ribs may be formed one on each side of the groove in which case the radially inner head portion of each one of said projections extends transversely across the groove to at least one of said ribs and the radially inner head portion of at least some of said projections may extend transversely across the full width of the groove.

In any of the above examples, the radially inner head portion preferably is located at, or adjacent, the radially innermost extremity of the groove, the radially outer stem portion and the radially inner head portion being of substantially the same length and extending across the groove over substantially the whole of its depth.

In each one of said projections it is preferred that the radially inner head portion is of circular transverse cross-section whilst the radially outer stem portion is of rectangular transverse cross-section, the longitudinal axis of the head portion being contained within and substantially parallel to a plane containing the stem portion.

The longitudinal axis of the head portion and the plane containing the stem portion of each one of said projections may be substantially normal to the circumferential plane of the groove or alternatively said axis and said plane are inclined, in part at least, to the circumferential plane of the groove.

In all of the above examples, it is preferred that a plurality of circumferentially-spaced-apart moulding blades extend radially inwardly from the base of the groove in between each two adjacent moulding projections for moulding additional openings in the rib of the tire, the depth of each such blade measured radially from the base of the groove being less than the overall depth of an adjacent moulding projection and the aggregate thickness of each such plurality of blades is equal to or greater than the thickness of the head portion of an adjacent moulding projection.

Also in accordance with the invention there is provided a pneumatic tire, the tread portion of which is produced by use of the apparatus as described above.

The invention is illustrated in more detail in the accompanying drawings wherein:

FIGURE 1 is a perspective view showing one segment of a tread moulding matrix of the apparatus constructed in accordance with the invention.

FIGURE 2 is a perspective view of part of the tread portion of a pneumatic tire moulded with use of the apparatus shown in FIGURE 1.

FIGURE 3 is a radial cross-sectional view along an axial line containing a plurality of moulded openings and channels of that part of the tire shown in FIGURE 2.

FIGURE 4 is an axial cross-sectional view along either of the lines 4—4 of that part of the tire shown in FIGURE 2.

Referring to FIGURE 1 of the drawings, there is shown one segment 10 of a mould, the complete mould comprising a plurality of such segments assembled into annular form, the radially inner surface of which defines a moulding matrix for moulding the tread portion of a pneumatic tire. The complete annular matrix is assembled within a mould which is separable on the mid-circumferential plane thereof to allow the carcass and the tread portion to be placed within and removed from the mould.

The moulding surface of the matrix has a plurality of circumferentially-extending grooves 11 and 12 formed therein, each one of which is of substantially symmetrical tapered transverse cross-sectional form. Circumferentially extending ribs 13 are provided one at each side of each groove 1, except at the axially outermost groove 12 where the ribs are formed only at the axially inner sides of such grooves. Each rib is of substantially symmetrical tapered transverse cross-sectional form.

A plurality of circumferentially-spaced-apart projections 14 extend radially inwardly from the radially outer base surface of each groove 11 and 12 and each such projection comprises a radially outer stem portion 15 of rectangular cross-sectional form with an integral radially inner head portion 16 of circular cross-sectional form. The plane containing the stem portion 15 of each projection 14 is parallel to the longitudinal axis of the head portion 16 of each projection, both said plane and said axis being normal to the circumferential plane of each groove. The length of the stem portion 15 along its major axis is equal to the length of the head portion 16 and each of the portions 16 extends across the full width of each groove at the radially innermost surface of each rib 13.

In addition to the integral stem and head portions 15 and 16 respectively, there are provided, in between each pair of adjacent projections 14, some three to six circumferentially spaced-apart additional blade portions 17 projecting radially inwardly from the radially outer base surface of each groove 11 and 12, the aggregate thicknesses of each set of such additional blade portions 17 being equal to or greater than the diameter of each head portion 16. Each one of these additional blade portions 17 is of zig-zag shape and does not extend across the full width of the grooves 11 and 12. Each such additional blade portion 17 does not extend radially over the full depth of the groove and is therefore shorter, in the radial sens of the mould, than the overall combined depth of each of the integral stem and head portion formations.

The tread portion of the tire is moulded by placing the carcass and tread portion within the tread moulding matrix and applying heat and pressure to the carcass and tread portion to cause the radially outer peripheral surface of the tread portion to conform to the radially inner moulding surface of the tread moulding matrix and also to vulcanise the rubber material of the tread portion. After a predetermined period of time the mould is opened and the vulcanised tire is removed.

A part of such a moulded tire is shown in FIGURES 2 to 4, the tire being of conventional toroidal transverse cross-sectional form having a tread portion 18, the ground-contacting surface of which is provided with a plurality of circumferentially extending axially-spaced-apart ribs 19 and 20 moulded by the grooves 11 and 12 respectively. Each rib is of substantially symmetrical tapered transverse cross-sectional form and circumferentially extending grooves 21, moulded by the ribs 13, are formed one at each side of each rib at the base thereof, except at the side-wall portions of the tire where the grooves 21 are formed only at the axially inner sides of the axially outermost ribs 20. Each groove is of substantially symmetrical tapered transverse cross-sectional form and extends radially inwardly from the ground-contacting surface of each rib for approximately 90% of the depth of the tread portion.

A plurality of circumferentially-spaced-apart openings in the form of slots 22 are formed in the ground-contacting surface of each rib 19 and 20 and each slot 22 communicates with an associated channel 23 formed in the rib radially inwardly from the ground-contacting surface thereof. Each slot 22 is of rectangular box-like configuration, corresponding to the configuration of the stem portion 15 by which it is moulded, the major axis of each slot extending transversely across the rib normal to the circumferential plane thereof, and each slot extends across the full width of the rib, each end of the slot opening out of the sides of the rib.

Each channel 23 is of cylindrical form, corresponding to the configuration of the head portion 16 by which it is moulded, the longitudinal axis of each channel also extending transversely across each rib 19 and 20 normal to the circumferential plane thereof, and each channel also extends across the full width of the rib, each end of the channel opening out of the sides of the rib. Each channel 23 is located radially inwardly of the ground-contacting surface of the rib at a position adjacent the radially inner surface of each groove 21 and in such a position that the radially innermost part of a slot 22 is in communication with the radially outermost part of an associated channel 23. Thus each slot 22 and associated channel 23 are of the same length extending across the full width of a rib 19 or 20 and the major axis of the slot is parallel to the longitudinal axis of the channel.

The channels 23 which are formed in the axially outermost ribs 20 inter-communicate between the sidewalls 25 of the tire and the grooves 21 which are formed at the axially inner sides of such ribs 20 whilst the channels which are formed in the remaining ribs 19 inter-communicate, at each end of the channels, between the grooves which are formed one at each side of such ribs.

In addition to the aforesaid slots 22 which communicate with the channels 23, some three to six circumferentially spaced-apart, additional slots 24 are formed in the ground-contacting surface of each rib 19 and 20 in between each pair of adjacent slots 22, these additional slots being of zig-zag shape and moulded by the blade portions 17.

Due to the fact that the length of the head portion 16 of each projection 14 is equal to the length of the stem portion 15, the tire may be removed from the mould without any tearing of the rubber of the tread portion since the head portions 16 will pull out of the moulded ribs 19 and 20 of the tread portion by sliding radially outwardly through the slots 22 which have been formed by the stem portions 15 of the projections 14. The removal of the head portions 16 from the moulded tread portion is facilitated by the provision of the aforementioned additional slots 24, the radially inner parts of the sidewalls of which will be pressed towards one another during removal of the moulding stem and integral head portion 15 and 16 respectively from the tire thereby allowing the rubber surrounding those moulded slots 22 which communicate with the moulded channels 23 to yield during removal of the moulding head portions 16 and thereby facilitating such removal.

This yielding of the rubber surrounding the moulded slots 22 and associated channels 23 is possible because the depths of the aforesaid additional moulding blade portions 17 is less than the combined depths of each of the integral moulding stem and head portion formations so that as each head portion 16 is withdrawn radially into and enters its associated moulded slot 22 the additional blade portions 17 will already have been partially withdrawn radially from their moulded slots 24 thereby leaving air spaces at the radially inner ends of the slots 24. The rubber surrounding these additional slots 24, together with the rubber surrounding the combined slot and channel formations 22 and 23 respectively, is thereby allowed to yield to some extent and will yield progressively as the moulding portions are withdrawn radially outwardly from the moulded tread portion.

Thus in the construction of tire as described, the channels 23 which are formed radially inwardly of the ground-contacting surface of the tread portion intercommunicate either between adjacent grooves 21 or between a groove and the sidewall portion 25 of the tire. During rolling movement of the tire upon a water-saturated surface, the majority of the water is deflected directly into the circumferential grooves 21 and is thrown clear by the centrifugal action of the rotating tire. However, increased volumes of water may be removed from the saturated surface by a tire constructed in accordance with the invention thereby reducing the possibility of the grooves becoming filled with water and the tendency for aquaplaning to commence.

This removal of an increased volume of water is accomplished by the provision of the slots 22 and channels 23 in the tread portion since excess water in the grooves 21 would be deflected laterally through the channels 23 and ejected from the tire through those channels which communicate with the sidewall portion 25 of the tire. Additionally that water which is not initially deflected into the grooves 21 would enter the slots 22 in the ground-contacting surfaces of the ribs and would be expelled from the slots into the channels 23 and from thence some water would flow into the grooves 21 to be expelled from the tire. The remaining water should be expelled centrifugally directly from the slots and channels when the tire rotates them clear of the ground-contact area.

In alternative constructions of apparatus (not illustrated), the head portions 16 of at least some of the moulding projections 14 do not extend transversely across the full width of each groove 11 but each head portion 16 does extend up to one of the moulding ribs 13. Also both the longitudinal axis of each portion 16 and the plane containing each portion 15 may be inclined to the circumferential plane of each groove 11 and 12 whilst the blade portions 17 may be of any suitable shape apart from zig-zag and at least some of them may extend transversely across the full width of each groove 11 and 12.

Having now described my invention, what I claim is:

1. Apparatus for moulding at least the tread portion of a pneumatic tire comprising a generally annular tread moulding matrix having, on its radially inner surface, at least one generally circumferential groove formed therein for moulding a rib in the tread portion and a plurality of circumferentially spaced-apart moulding projections extending radially inwardly from the base of the groove, each projection comprising a radially outer stem portion for moulding an opening in the rib and a radially inner head portion of enlarged curved transverse cross-sectional form for moulding a channel, the head portion extending transversely across the groove.

2. Apparatus as claimed in claim 1 wherein generally circumferential moulding ribs are formed one on each side of the groove and the radially inner head portion of each one of said projections extends transversely across the groove to at least one of said ribs.

3. Apparatus as claimed in claim 1 wherein the radially innerhead portion of at least some of said projections extends transversely across the full width of the groove.

4. Apparatus as claimed in claim 1 wherein the radially inner head portion of each one of said projections is located near the radially innermost extremity of the groove.

5. Apparatus as claimed in claim 1 wherein the radially outer stem portion and the radially inner head portion of each one of said projections are of substantially the same length and extend across the groove over substantially the whole of its depth.

6. Apparatus as claimed in claim 1 wherein the radially outer stem portion of each one of said projections is of rectangular transverse cross-sectional form.

7. Apparatus as claimed in claim 6 wherein, in each one of said projections, the longitudinal axis of the radially inner head portion is contained within and is substantially parallel to a plane containing the radially outer stem portion.

8. Apparatus as claimed in claim 7 wherein, in each one of said projections, the longitudinal axis of the radially inner head portion and the plane containing the radially outer stem portion are substantially normal to the circumferential plane of the groove.

9. Apparatus as claimed in claim 7 wherein, in each one of said projections, the longitudinal axis of the radially inner head portion and the plane containing the radially outer stem portion are inclined, in part at least, to the circumferential plane of the groove.

10. Apparatus as claimed in claim 1 wherein a plurality of circumferentially-spaced-apart moulding blades extend radially inwardly from the base of the groove in between each two adjacent moulding projections for moulding additional openings in the rib of the tyre.

11. Apparatus as claimed in claim 10 wherein the depth of each blade, measured radially from the base of the groove, is less than the overall depth of an adjacent moulding projection.

12. Apparatus as claimed in claim 11 wherein the aggregate thickness of each such plurality of blades is equal to or greater than the thickness of the head portion of an adjacent moulding projection.

References Cited

UNITED STATES PATENTS

| 2,275,582 | 3/1942 | Brill | 18—38 X |
| 2,779,060 | 1/1957 | Knox | 18—38 |
| 2,848,744 | 8/1958 | Crooker | 18—44 |

HOWARD FLINT, JR., *Primary Examiner.*

U.S. Cl. X.R.

18—38